F. R. CORNWALL.
CHAIN CONVEYER.
APPLICATION FILED JUNE 15, 1910.
1,038,726.
Patented Sept. 17, 1912.
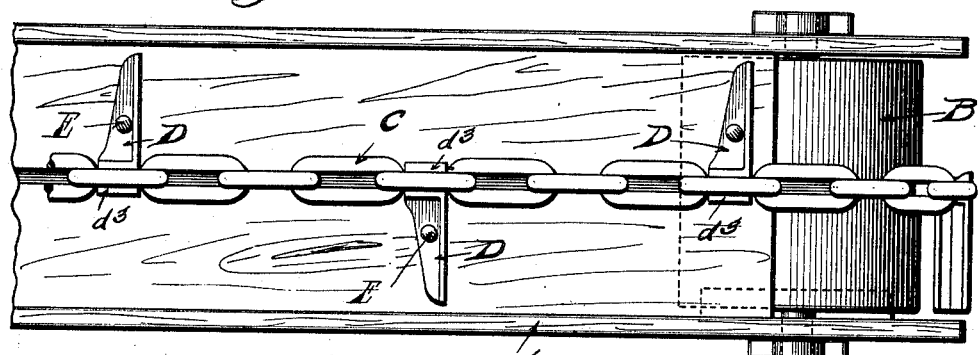
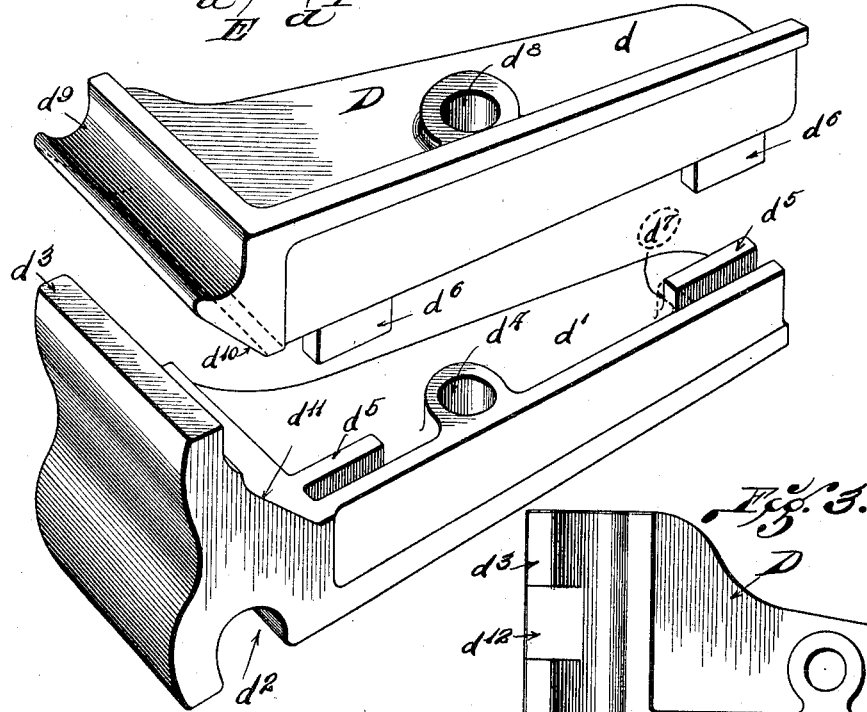

UNITED STATES PATENT OFFICE.

FREDERICK R. CORNWALL, OF ST. LOUIS, MISSOURI, ASSIGNOR TO C. T. PATTERSON COMPANY, LTD., OF NEW ORLEANS, LOUISIANA, A CORPORATION OF LOUISIANA.

CHAIN CONVEYER.

1,038,726.    Specification of Letters Patent.    Patented Sept. 17, 1912.

Application filed June 15, 1910. Serial No. 566,981.

*To all whom it may concern:*

Be it known that I, FREDERICK R. CORNWALL, a citizen of the United States, residing at St. Louis, Missouri, have invented a certain new and useful Improvement in Chain Conveyers, of which the following is a full, clear, and exact description, such as will enable others skilled in the art to which it appertains to make and use the same, reference being had to the accompanying drawings, forming part of this specification, in which—

Figure 1 is a top plan view of a trough in which is arranged a section of my improved chain conveyer. Fig. 2 is a side elevation of one of the conveyer flights, the parts being separated. Fig. 3 is a plan view of a modified form. Fig. 4 is a vertical longitudinal section taken through the approximate center of the flight.

This invention relates to a new and useful improvement in chain conveyers especially adapted for use in carrying off refuse lumber from saw mills, etc., being designed as an improvement on the chain conveyer illustrated in the United States Patent No. 943,734 granted to Thomas A. Coleman December 21, 1909.

The features of my present invention reside in the novel construction of the flight (or cleat, as it is sometimes called), which is made in two parts, the line of division being longitudinally disposed so that one of said parts may be slid upon the other in mounting the flight in the link of a chain, the said parts being held together by rivet or other fastening devices.

In the drawings, A indicates the trough; B the sheave over which the chain passes and C the chain.

D indicates the flights of my improved conveyer chain which, as shown in Figs. 1 and 2, consist of two castings $d$ and $d'$. In one of these castings, preferably the lower, there is a recess $d^2$ for receiving the lower portion of the link of the chain. The upper portion of said end containing said recess, which may be termed the butt end of the flight, is extended upwardly so as to engage the link as at $d^3$.

$d^4$ indicates a rivet opening, and $d^5$ are two webs preferably arranged parallel to the vertical front wall of this half of the flight, which webs and said front wall form interlocks with tongues $d^6$ on the upper half of the flight. If desired, the web $d^5$ at the free end of the flight may be strengthened by a connecting wall $d^7$ at its inner end as shown by dotted lines in Fig. 2.

The upper half $d$ of the flight is provided with a rivet opening $d^8$ which is designed to register with the rivet opening in the lower half for the passage of the rivet E (see Fig. 1). The butt end of the upper half is provided with a recess $d^9$ which is designed to coöperate with the projection $d^3$ of the lower half of the flight to provide a seat for the upper portion of the link. Inclined faces $d^{10}$ and $d^{11}$ are provided below the link seat thus formed whereby an abutment is formed to prevent inclined longitudinal movement of the upper half of the flight.

In assembling the flight in the link of a chain the lower half is first arranged in position with the lower portion of the link in the recess $d^2$; then the upper half is slipped longitudinally into position, the tongues interlock with the webs and the front wall before described so as to prevent lateral displacement of the upper half; and the rivet E holding the parts together against vertical and longitudinal displacement.

In Fig. 3 of the drawings I have shown a modified form in which the tongues $d^6$ may be dispensed with. In this form the wall $d^3$ before described is provided with a recess into which extends a tongue $d^{12}$ serving as an interlock and permitting the upper half of the flight to be slid longitudinally into position.

What I claim is:

1. A flight for conveyer chains comprising a carrying member divided substantially throughout its entire length, the adjacent faces of the two parts of the divided member having interfitting projections and recesses, which permits one of said parts to have a longitudinal sliding movement with respect to the opposite part when said parts are assembled and positioned on a chain or taken apart, there being transversely disposed link receiving grooves formed in the top and bottom of said carrying member at one end thereof and means passing through the two parts of the divided member between the interfitting projections and recesses for fastening said parts together.

2. In a conveyer chain the combination with the chain proper, of a flight comprising two castings, one of which is provided with a link seat and both of which when assembled form another link seat, and interlocking recesses and projections whereby one of said castings may be slid longitudinally upon the opposite casting into and from position, and means for locking the two parts together in position.

3. A flight for conveyer chains comprising two castings, one of which has a link receiving recess at its butt end and both of which form another link receiving recess at said butt end, means on the adjacent faces of the two castings for interlocking said castings together and permit longitudinal movement of one casting relative to the other, and registering openings in said castings for receiving fastening devices to hold the castings together when in position.

4. A flight for conveyer chains comprising two mating parts one of which is provided with a transversely disposed link-receiving recess in its butt end and both of which parts form another link-receiving recess at said butt end, one of said parts being provided with a pair of recesses, lugs depending from the adjacent face of the opposite part which lugs normally occupy the recesses, and means for locking the two parts together in position on the conveyer chain.

5. A conveyer cleat comprising a top and a bottom member including flanges having opposed vertical wall members and endwise abutting reinforcing members, and means for detachably connecting said top and bottom members together; said bottom member being provided with a chain link receiving groove and the upper faces of the bottom and top members being provided with recesses combining to form a chain link receiving groove.

In testimony whereof I hereunto affix my signature in the presence of two witnesses, this 11th day of June, 1910.

FREDERICK R. CORNWALL.

Witnesses:
M. P. SMITH,
BLANCHE L. CROWLEY.

Copies of this patent may be obtained for five cents each, by addressing the "Commissioner of Patents, Washington, D. C."